US012311365B2

(12) United States Patent
Li et al.

(10) Patent No.: US 12,311,365 B2
(45) Date of Patent: May 27, 2025

(54) MICROFLUIDIC APPARATUS AND MANUFACTURING METHOD THEREOF

(71) Applicant: Shanghai Tianma Micro-Electronics Co., Ltd., Shanghai (CN)

(72) Inventors: Wei Li, Shanghai (CN); Baiquan Lin, Shanghai (CN); Kerui Xi, Shanghai (CN); Linzhi Wang, Shanghai (CN); Zhenyu Jia, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 205 days.

(21) Appl. No.: 17/357,335

(22) Filed: Jun. 24, 2021

(65) Prior Publication Data

US 2021/0316301 A1 Oct. 14, 2021

(30) Foreign Application Priority Data

Jan. 29, 2021 (CN) ......................... 202110130018.3

(51) Int. Cl.
*B01L 3/00* (2006.01)

(52) U.S. Cl.
CPC ..... *B01L 3/50273* (2013.01); *B01L 3/502707* (2013.01); *B01L 2200/12* (2013.01); *B01L 2300/0887* (2013.01); *B01L 2400/0415* (2013.01)

(58) Field of Classification Search
CPC ..... B01L 2400/0415; B01L 2300/0887; B01L 2200/12; B01L 3/502707; B01L 3/50273
See application file for complete search history.

(56) References Cited

U.S. PATENT DOCUMENTS 8,187,864 B2 * 5/2012 Wheeler ........... B01L 3/502784 435/287.9
2008/0112854 A1 * 5/2008 Park .................. B01L 3/502707 422/400

(Continued)

FOREIGN PATENT DOCUMENTS

CN 101862631 A 10/2010
CN 105026932 A 11/2015

(Continued)

OTHER PUBLICATIONS

Lin et al., CN 109894169A translated Description, 2019, ESPACENET (Year: 2019).*

(Continued)

*Primary Examiner* — Lyle Alexander
*Assistant Examiner* — Mickey Huang
(74) *Attorney, Agent, or Firm* — von Briesen & Roper, s.c.

(57) ABSTRACT

Provided are a microfluidic apparatus and a manufacturing method thereof. The microfluidic apparatus includes a microfluidic substrate including a base substrate, an electrode array layer located on the base substrate, and a hydrophobic layer, where the electrode array layer includes a plurality of electrodes arranged in an array; and a microfluidic structure layer including at least one microfluidic channel; where the microfluidic substrate is configured to apply a voltage to each of the plurality of electrodes according to the at least one microfluidic channel to drive a droplet in each of the at least one microfluidic channels to move.

9 Claims, 11 Drawing Sheets

(56) References Cited

U.S. PATENT DOCUMENTS

| | | | | |
|---|---|---|---|---|
| 2013/0134039 | A1* | 5/2013 | Bjornson | B01L 3/505 204/601 |
| 2016/0318019 | A1* | 11/2016 | Ledden | B01L 3/502715 |

FOREIGN PATENT DOCUMENTS

| | | | | | |
|---|---|---|---|---|---|
| CN | 109847817 | A | | 6/2019 | |
| CN | 109894169 | A | * | 6/2019 | B01F 13/0076 |

OTHER PUBLICATIONS

Bayiati et al., Electrowetting on plasma-deposited fluorocarbon hydrophobic films for biofluid transport in microfluidics, Journal of Applied Physics 101, 103306 (2007) (Year: 2007).*

* cited by examiner

MICROFLUIDIC APPARATUS AND MANUFACTURING METHOD THEREOF

CROSS-REFERENCE TO RELATED APPLICATION(S)

This application claims priority to Chinese Patent Application No. 202110130018.3 filed Jan. 29, 2021, the disclosure of which is incorporated herein by reference in its entirety.

TECHNICAL FIELD

Embodiments of the present disclosure relate to microfluidic technology and, in particular, to a microfluidic apparatus and a manufacturing method thereof.

BACKGROUND

The microfluidic chip has the advantages of strong integration and fast analysis speed, low consumption, low material consumption, and low pollution when it is applied to process samples. Therefore, the application of microfluidic chips in various fields such as biomedical research, drug synthesis screening, environmental monitoring and protection, health quarantine, forensic identification, and biological reagent detection has extremely broad prospects.

At present, the droplet driving mode of the microfluidic chip is to use an external drive pump to extract droplets to make them move, but this mode is costly, bulky, and inflexible to control.

SUMMARY

The embodiments of the present disclosure provide a microfluidic apparatus and a manufacturing method thereof to achieve the small size, low cost, and flexible control of microfluidic chips.

The embodiments of the present disclosure provide a microfluidic apparatus. The microfluidic apparatus includes a microfluidic substrate and a microfluidic structure layer.

The microfluidic substrate includes a base substrate, an electrode array layer located on the base substrate, and a hydrophobic layer, where the electrode array layer includes a plurality of electrodes arranged in an array.

The microfluidic structure layer includes at least one microfluidic channel.

The microfluidic substrate is configured to apply a voltage to each of the plurality of electrodes according to the at least one microfluidic channel to drive a droplet in each of the at least one microfluidic channels to move.

Based on the same concept, the embodiments of the present disclosure further provide a manufacturing method thereof. The method includes the steps described below.

A first substrate is provided, where the first substrate includes a base substrate and an electrode array layer located on the base substrate, where the electrode array layer includes a plurality of electrodes arranged in an array.

A first hydrophobic layer and a first microfluidic structure layer are formed on the electrode array layer, where the first microfluidic structure layer includes at least one microfluidic channel.

In the embodiments of the present disclosure, the microfluidic substrate controls the potential of the electrodes to control the droplet to move without using an additional drive pump, which reduces the size of the device and improves portability; and microfluidic channels are provided in the microfluidic structure layer, which can define the droplet movement path, make the operation to control the droplet to move flexible and prevent the droplet from crosstalk caused by adjacent electrodes, thereby avoiding the droplet movement path being offset. Therefore, the microfluidic apparatus integrates as a whole, thereby reducing product cost.

BRIEF DESCRIPTION OF DRAWINGS

In order that technical solutions in embodiments of the present disclosure or the related art to explain more clearly, drawings to be used in the description of the embodiments or the related art are briefly described hereinafter. Apparently, while the drawings in the description are some embodiments of the present disclosure, for those skilled in the art, these drawings may be expanded and extended to other structures and drawings according to the basic concepts of the device structure, driving method and manufacturing method disclosed and indicated in embodiments of the present disclosure. These are undoubtedly all within the scope of the claims of the present disclosure.

DETAILED DESCRIPTION

In order that the objects, technical solutions and advantages of the present disclosure are clearer, the technical solutions of the present disclosure are described more clearly and completely hereinafter with reference to drawings of embodiments of the present disclosure and in conjunction with implementations. Apparently, the embodiments described herein are some embodiments, not all embodiments, of the present disclosure. All other embodiments obtained by those skilled in the art based on the basic concepts disclosed and indicated in embodiments of the present disclosure are within the scope of the present disclosure.

Figure 1:
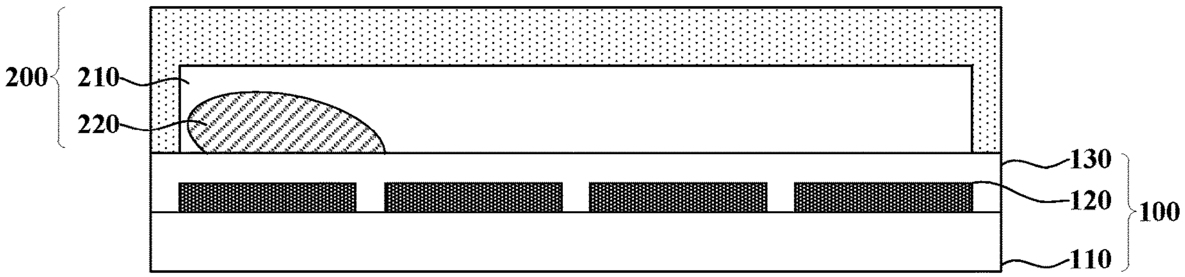
FIG. 1 is a schematic diagram of a first microfluidic apparatus according to an embodiment of the present disclosure.
Figure 2:
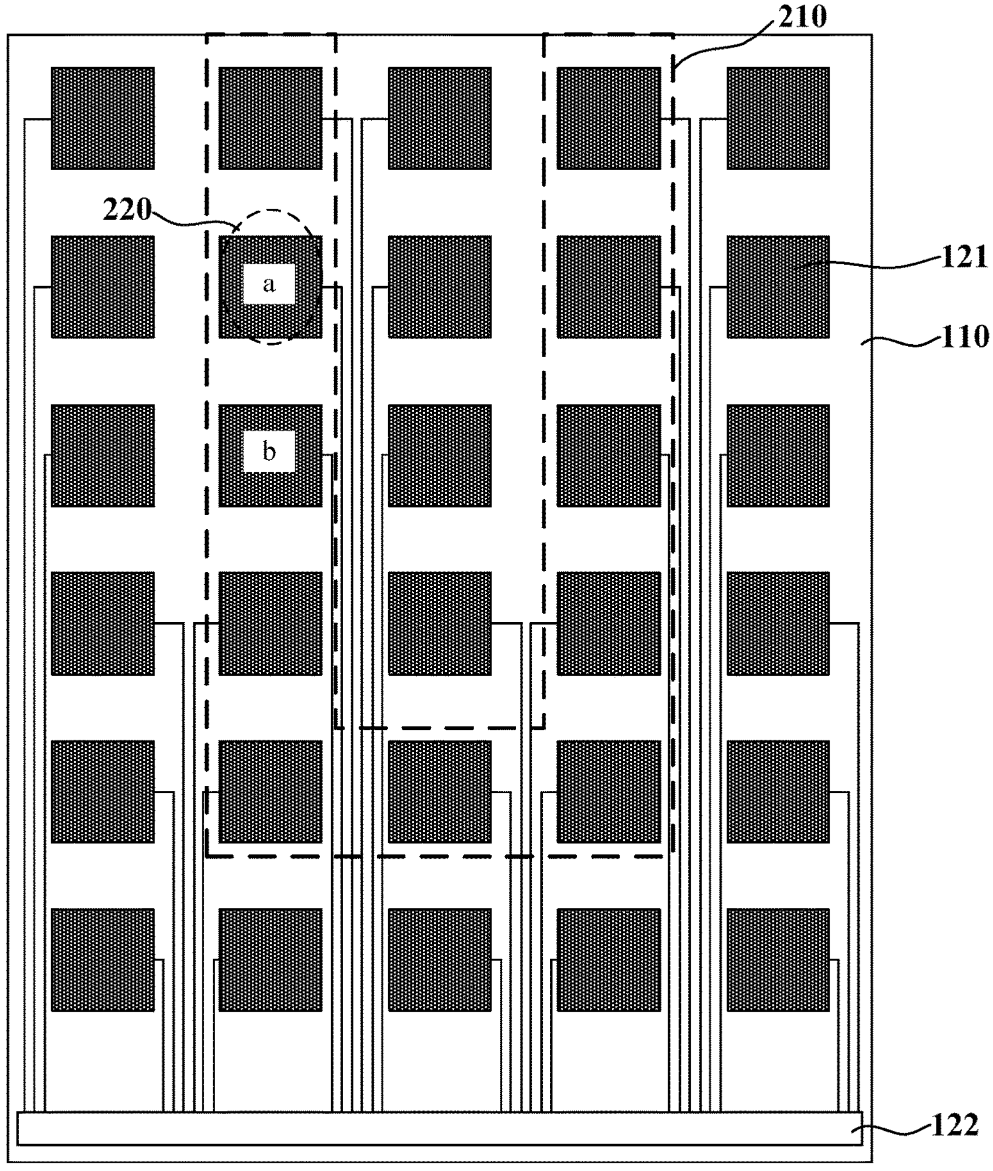
FIG. 2 is a structural diagram of a microfluidic substrate.

With reference to FIG. 1, FIG. 1 is a schematic diagram of a microfluidic apparatus according to an embodiment of the present disclosure, and FIG. 2 is a top view of the microfluidic substrate. The microfluidic apparatus provided by the embodiment includes a microfluidic substrate 100 including a base substrate 110, an electrode array layer 120 located on the base substrate 110, and a hydrophobic layer 130, where the electrode array layer 120 includes a plurality of electrodes 121 arranged in an array; and a microfluidic structure layer 200 including at least one microfluidic channel 210; where the microfluidic substrate 100 is configured to apply a voltage to each of the plurality of electrodes 121 according to the at least one microfluidic channel 210 to drive a droplet 220 in each of the at least one microfluidic channels 210 to move.

Figure 3:
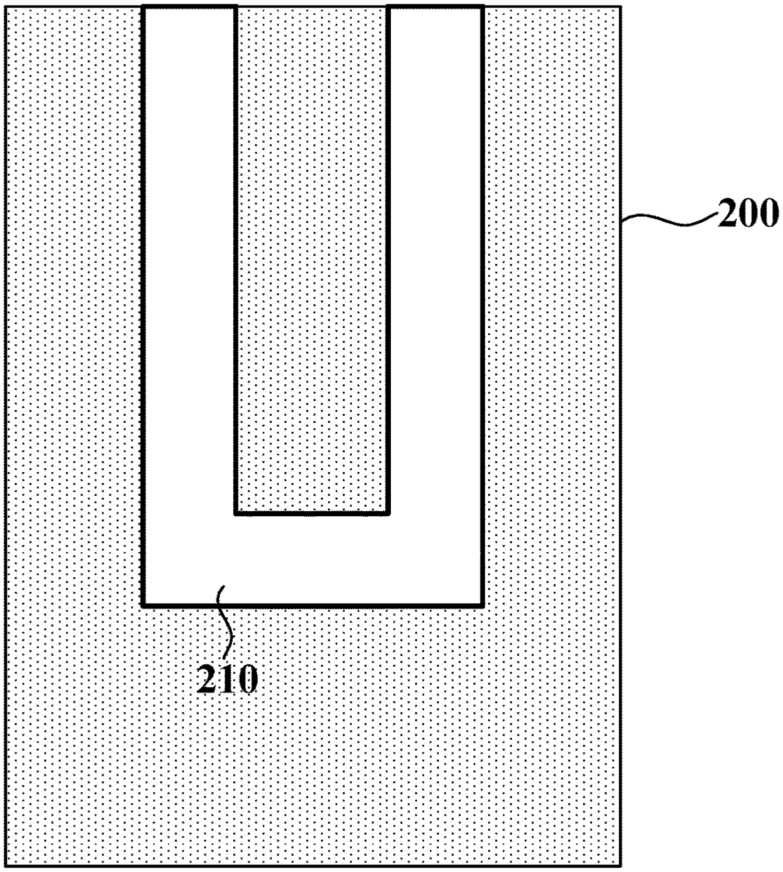
FIG. 3 is a structural diagram of a first microfluidic structure layer.

In the embodiment, the microfluidic apparatus includes a microfluidic structure layer 200. The microfluidic structure layer 200 has one or more mutually independent microfluidic channels 210 customized therein according to the experimental scheme. It is to be understood that the number and path of the microfluidic channels 210 in the microfluidic structure layer 200 may vary with the experimental scheme. FIG. 3 illustrates a microfluidic structural layer 200 with 1 U-shaped microfluidic channel 210 customized therein.

The microfluidic channels 210 within the microfluidic structure layer 200 play a role in defining the movement path of the droplet 220. The microfluidic channel 210 can also assist in the stable movement of the droplet 220, thereby preventing crosstalk caused by adjacent electrodes when the droplet 220 moves under the control of the electrode 121 and avoiding the phenomenon that the movement path of the droplet 220 is shifted due to the influence of gravity. When the microfluidic structure layer 200 is attached to the microfluidic substrate 100, then the microfluidic channel 210 is a closed environment, and thus the droplet 220 is in a closed and clean biochemical reaction environment and is not affected by external impurities, thereby improving the accuracy of experimental results.

In the embodiment, the microfluidic apparatus further includes a microfluidic substrate 100. The microfluidic substrate 100 includes a base substrate 110, an electrode array layer 120 located on the base substrate 110, and a hydrophobic layer 130, and the microfluidic structure layer 200 is attached to the microfluidic substrate 100 through the hydrophobic layer 130. The base substrate 110 serves as a carrier for other film layer structures and is used for the other film layers to be sequentially stacked on the base substrate 110. The hydrophobic layer 130 is an insulating hydrophobic layer that acts as an insulator and isolator of moisture. The electrode array layer 120 is disposed between the base substrate 110 and the hydrophobic layer 130.

The electrode array layer 120 includes a plurality of electrodes 121 arranged in an array. It is to be understood that the periphery of the electrode array layer 120 is further provided with a driver circuit 122. Each of the plurality of electrodes 121 of the electrode array layer 120 is electrically connected to the driver circuit 122, and the drive circuit 122 separately applies a voltage to each of the plurality of electrodes 121 so that the voltages of the adjacent electrodes 121 are different from each other and greater than a droplet movement threshold voltage. In this way, the droplet 220 moves under the drive of the electrode 121. In a direction perpendicular to the base substrate 110, the droplet may overlap two adjacent electrodes, and if most of the droplet is located on one electrode x of the electrodes, the droplets may be referred to herein as being located on the electrode x.

In other embodiments, the driver circuit may also actively control the electrodes. Specifically, the base substrate includes a plurality of first signal lines extending in the row direction and a plurality of second signal lines extending in the column direction. The areas defined by the insulated intersection of the first signal lines and the second signal lines are electrode areas, and each of the electrode areas includes an electrode and a driver sub-circuit electrically connected to the electrode. One first signal line applies a signal to a row of driver sub-circuits to turn them ON or OFF, one second signal line applies a voltage transmitted to the electrode to a row of driver sub-circuits, and each of the On driver sub-circuits applies a voltage signal transmitted by the second signal line to the corresponding electrodes. The electrode is controlled using this active driving manner to achieve control on the droplet movement.

There is one droplet 220 in the microfluidic channel 210, and the droplet 220 is located on the electrode a. The driver circuit 122 applies a high voltage to the electrode b which is adjacent to the electrode a. The potential of the electrode b is higher than the potential of the electrode a, and the voltage difference between the electrode a and the electrode b is greater than the droplet movement threshold voltage. Then, an electric field is formed between the electrode a and the electrode b to cause the pressure difference inside the droplet 220 and the asymmetric deformation of the droplet 220 so that the droplet 220 moves from the electrode a to the electrode b. In the specific implementation, the driver circuit 122 controls the potential of the electrodes 121 to be different according to the path of the microfluidic channel 210 so that the droplet 220 moves in the microfluidic channel 210 and finally reaches a desired position.

The drive timing of the potential of the electrodes 121 is pre-stored in the driver circuit 122. It is obvious that only when the drive timing coincides with the path of the microfluidic channel 210 can the droplet 220 be controlled to move within the microfluidic channel 210. If a plurality of independent microfluidic channels 210 are formed within the microfluidic structure layer 200, a plurality of independent drive timings are pre-stored in the driver circuit 122. Each of the plurality of drive timings corresponds to a respective one of the plurality of microfluidic channels 210. The driver circuit 122 independently controls the droplet in each of the plurality of microfluidic channels 210 to move separately or simultaneously according to the plurality of drive timings according to the experimental scheme. The driver circuit 122 also controls a plurality of droplets within the microfluidic channel 210 to separately move or fuse with each other according to the drive timing according to the experimental scheme.

The microfluidic substrate 100 controls the potential of the electrode 121 so as to achieve the movement control of the droplet 220 and does not need an external driving system to drive the droplet. Therefore, the microfluidic apparatus integrates as a whole, thereby reducing product costs. In addition, the microfluidic substrate 100 may control droplets in a multi-path microfluidic channel 210 to move so that the control operation of the droplet movement is flexible and easy to be conducted.

It is to be noted that the microfluidic substrate can not only drive the droplet, but also position the droplet. For example, the driver circuit collects the capacitance between the electrodes, and determines the location of the droplet according to the capacitance change. It is to be understood that the capacitance formed between the electrode at the location where the droplet is located and the other electrodes around this electrode is different from the capacitance formed between electrodes at the locations where the droplet is not located so that the driver circuit determines the location of the droplet according to the magnitude of the received capacitance. Therefore, the electrodes in the electrode array layer serve as transport electrodes to achieve droplet movement. The electrodes in the electrode array layer can also serve as detection electrodes to position the location of droplets.

In the embodiment of the present disclosure, the microfluidic substrate controls the potential of the electrodes to control the droplet to move without using an additional drive pump, which improves the use portability; and microfluidic channels are provided in the microfluidic structure layer on the microfluidic substrate, which can define the droplet movement path and prevent the droplet from crosstalk caused by adjacent electrodes, thereby avoiding the droplet movement path being offset. Therefore, the microfluidic apparatus integrates as a whole, thereby reducing product costs, and the control operation of the droplet movement is flexible and easy to be conducted.

In an embodiment, on the basis of the above technical solution, the microfluidic structure layer is detachably bonded to the hydrophobic layer.

In the embodiment, since the microfluidic structure layer is detachably bonded to the hydrophobic layer, the microfluidic structure layer is a replaceable structure. The microfluidic structure layer, when used as the droplet reaction structure layer, needs to be customized according to the experimental scheme. The microfluidic channels required by different experimental schemes may be different, and the biochemical environment required by the droplet needs to be clean, so the microfluidic structure layer is a disposable consumable.

The microfluidic structure layer is detachably bonded to the droplet reaction structure layer through the hydrophobic layer. In the experimental stage, the microfluidic structure layer corresponding to the experimental scheme is bonded to the hydrophobic layer. After the experimental scheme is replaced, the original microfluidic structure layer is stripped from the microfluidic substrate, the hydrophobic layer is cleaned and renewed, and then a new microfluidic structure layer is attached to the hydrophobic layer. The microfluidic substrate in the microfluidic apparatus is reused, thereby reducing the cost. It is to be understood that after the microfluidic structure layer on the microfluidic substrate is replaced, the drive timing in the microfluidic substrate is replaced with the drive timing corresponding to the new microfluidic structure layer.

In an embodiment, the composition material of the microfluidic structure layer comprises a polymer. In an embodiment, the microfluidic structure layer is bonded to the hydrophobic layer by the plasma surface bonding process. Optionally, the microfluidic structure layer is a polydimethylsiloxane (PDMS) structure layer or a polycarbonate (PC) structure layer. A microfluidic structure substrate is manufactured using a polymer, and microfluidic channels are formed on the microfluidic structure substrate. Since the microfluidic structure layer is manufactured using a polymer, the microfluidic structure layer can be bonded to the hydrophobic layer by the plasma surface bonding process. PDMS is polydimethylsiloxane. As a kind of polymer material, PDMS is cheap, easy to process, transparent to visible light and partial ultraviolet light, biocompatible, and thus is suitable to manufacture the microfluidic structure layer. In other embodiments, the microfluidic structure layer is composed of a PC material.

It is to be understood that, on the basis of ensuring that the microfluidic structure layer still has its own functions and can be detachably bonded to the hydrophobic layer, the microfluidic structure layer can be composed of other materials and attached by other attachment processes, which is not limited herein. In order to improve the performance of the microfluidic structure layer or meet different experimental requirements, the microfluidic structure layer may also be composed of a variety of materials, which are not described in detail herein.

In an embodiment, at least one side of the microfluidic structure layer is provided with a stripping structure; and in a direction perpendicular to the microfluidic substrate, the stripping structure and the hydrophobic layer include at least one of the following relationships: a gap exists between the stripping structure and the hydrophobic layer, or an orthographic projection of the stripping structure on the microfluidic substrate does not overlap the hydrophobic layer and the stripping structure is disposed to be adjacent to the hydrophobic layer.

Figure 4:
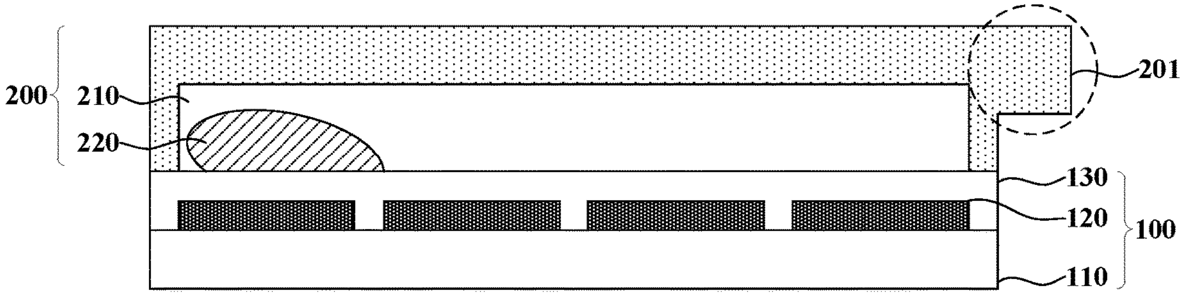
FIG. 4 is a schematic diagram of a second microfluidic apparatus according to an embodiment of the present disclosure.

With reference to FIG. 4, FIG. 4 is a schematic diagram of a microfluidic apparatus according to an embodiment of the present disclosure. As shown in FIG. 4, at least one side of the microfluidic structure layer 200 is provided with a stripping structure 201. The stripping structure 201 may be a raised structure of the microfluidic apparatus. In the direction perpendicular to the microfluidic substrate 100, the orthographic projection of the stripping structure 201 on the microfluidic substrate 100 does not overlap the hydrophobic layer 130, and the stripping structure 201 is disposed to be adjacent to the hydrophobic layer 130. The stripping structure 201 may assist in the stripping of the microfluidic structure layer 200 from the microfluidic substrate 100, thereby improving the stripping success rate and preventing the stripping action from damaging the electrodes of the microfluidic substrate 100.

Figure 5:
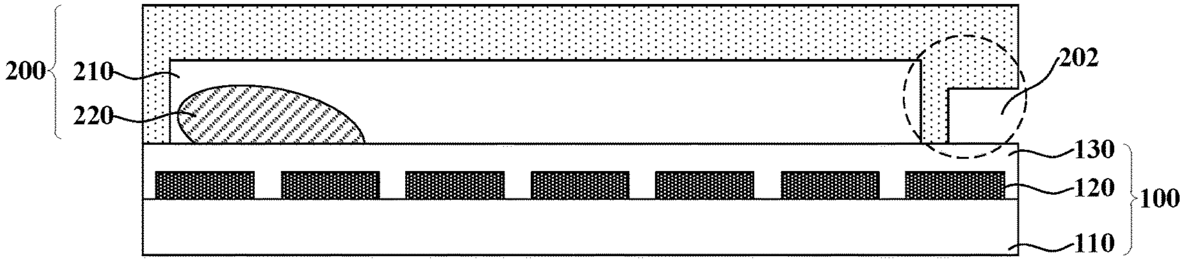
FIG. 5 is a schematic diagram of a third microfluidic apparatus according to an embodiment of the present disclosure.

With reference to FIG. 5, FIG. 5 is a schematic diagram of a microfluidic apparatus according to an embodiment of the present disclosure. As shown in FIG. 5, at least one side of the microfluidic structure layer 200 is provided with a stripping structure 202. The stripping structure 202 may be a groove structure of the microfluidic apparatus. In the direction perpendicular to the microfluidic substrate 100, the stripping structure 202 can be regarded as a gap between the microfluidic structure layer 200 and the hydrophobic layer 130. The stripping structure 202 may assist in the stripping of the microfluidic structure layer 200 from the microfluidic substrate 100, thereby improving the stripping success rate and preventing the stripping action from damaging the electrodes of the microfluidic substrate 100.

It is to be noted that the process parameters for bonding the microfluidic structure layer and the hydrophobic layer need to meet the condition that the microfluidic channel and the hydrophobic layer can form a closed environment to prevent external impurities from entering the microfluidic channel through the bonding surface to affect the droplet, and also need to meet the condition that the hydrophobic layer and the microfluidic structure layer can be easily stripped from each other to avoid the stripping action from damaging the microfluidic substrate function.

In an embodiment, the hydrophobic layer detachably adheres to the electrode array layer.

In the embodiment, since the microfluidic structure layer is on the hydrophobic layer and the hydrophobic layer is detachably bonded to the electrode array layer, the hydrophobic layer and the microfluidic structure layer on the hydrophobic layer as a whole belong to the replaceable structure. Since the microfluidic structure layer is a disposable consumable and the hydrophobic layer is detachably attached to the electrode array layer, the hydrophobic layer and the microfluidic structure layer on the hydrophobic layer are stripped from the microfluidic substrate and then replaced with the microfluidic structure layer integrated with the hydrophobic layer so that the replacement of the microfluidic structure layer in the microfluidic apparatus and the reuse of the microfluidic substrate can be achieved. The microfluidic substrate in the microfluidic apparatus is reused, thereby reducing the cost. It is to be understood that after the microfluidic structure layer in the microfluidic apparatus is replaced, the drive timing in the microfluidic substrate is replaced with the drive timing corresponding to the new microfluidic structure layer.

It is to be noted the hydrophobic layer and the electrode array layer may be adhered to each other by using a gel layer or in a bonding manner. It is to be understood that since other film layers such as an insulating layer are generally provided between the electrode array layer and the hydrophobic layer of the microfluidic substrate, the attachment of the hydrophobic layer and the electrode array layer is, in fact, the attachment of the hydrophobic layer and the insulating layer on the electrode array layer. The film layer structure between the hydrophobic layer and the electrode array layer is not described in detail herein.

In an embodiment, the composition material of the hydrophobic layer includes a polymer. The hydrophobic layer is detachably bonded to the electrode array layer by the plasma surface bonding process. In an embodiment, the hydrophobic layer is a PDMS structure layer or a PC structure layer.

In the embodiment, the hydrophobic layer and the microfluidic structure layer are manufactured using the same material. For example, the microfluidic structure layer is manufactured using PDMS, and then a layer of the hydrophobic layer composed of the same material is bonded to the microfluidic structure layer. Alternatively, the hydrophobic layer and the microfluidic structure layer are manufactured using different materials. For example, the microfluidic structure layer is manufactured using PDMS, and then a layer of the hydrophobic layer composed of PC is bonded to the microfluidic structure layer. It is to be understood that, on the basis of ensuring that the hydrophobic layer can be stripped from the microfluidic substrate, the hydrophobic layer can be composed of other materials and attached by other attachment processes, which is not limited herein. For example, the hydrophobic layer can be manufactured using a variety of materials, which is not described in detail herein.

In an embodiment, at least one side of the hydrophobic layer is provided with a stripping structure, and in the direction perpendicular to the microfluidic substrate, the orthographic projection of the stripping structure on the microfluidic substrate does not overlap the electrode array layer.

Figure 6:
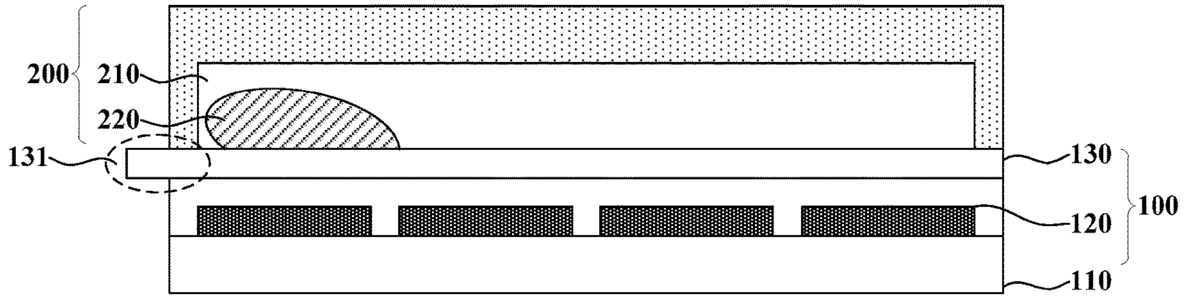
FIG. 6 is a schematic diagram of a fourth microfluidic apparatus according to an embodiment of the present disclosure.

With reference to FIG. 6, FIG. 6 is a schematic diagram of a microfluidic apparatus according to an embodiment of the present disclosure. As shown in FIG. 6, at least one side of the microfluidic structure layer 130 is provided with a stripping structure 131. The stripping structure 131 may be a raised structure of the microfluidic apparatus. In the direction perpendicular to the microfluidic substrate 100, the orthographic projection of the stripping structure 131 on the microfluidic substrate 100 does not overlap the electrode array layer 120. The stripping structure 131 may assist in the stripping of the hydrophobic layer from the microfluidic substrate 100, thereby improving the stripping success rate and preventing the stripping action from damaging the electrodes of the microfluidic substrate 100.

Figure 7:
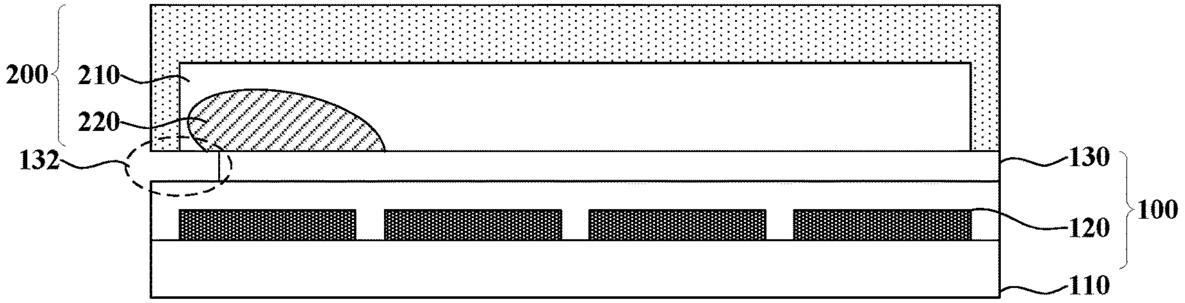
FIG. 7 is a schematic diagram of a fifth microfluidic apparatus according to an embodiment of the present disclosure.

With reference to FIG. 7, FIG. 7 is a schematic diagram of a microfluidic apparatus according to an embodiment of the present disclosure. As shown in FIG. 7, at least one side of the microfluidic structure layer 130 is provided with a stripping structure 132. The stripping structure 132 may be a groove structure of the microfluidic apparatus. In the direction perpendicular to the microfluidic substrate 100, the stripping structure 132 can be regarded as a gap between a film layer adjacent to the hydrophobic layer 130 on the microfluidic structure layer 100 and the hydrophobic layer 130. The stripping structure 132 may assist in the stripping of the hydrophobic layer 130 from the microfluidic substrate 100, thereby improving the stripping success rate and preventing the stripping action from damaging the electrodes of the microfluidic substrate 100.

It is to be noted that the process parameters for bonding the hydrophobic layer and the microfluidic structure layer need to meet the condition that the hydrophobic layer can be easily stripped from the microfluidic substrate to avoid the stripping action from damaging the electrode function of the microfluidic substrate.

In an embodiment, on the basis of the above technical solution, the microfluidic structure layer includes a plurality of microfluidic channels arranged at intervals, the orthographic projection of a minimum gap between two adjacent microfluidic channels of the plurality of microfluidic channels on the electrode array layer covers at least one of the plurality of electrodes, and the microfluidic substrate is configured to apply a voltage to each of the plurality of electrodes according to each of the plurality of microfluidic channels to drive a droplet in each of the plurality of microfluidic channels to move separately or simultaneously.

Figure 8:
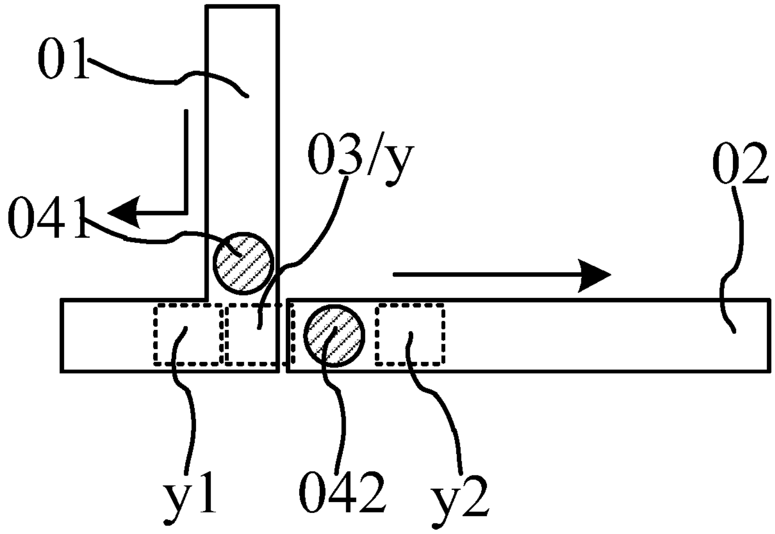
FIG. 8 is a structural diagram of an abnormal microfluidic channel.

There is a negative example below. With reference to FIG. 8, FIG. 8 is a structural diagram of an abnormal microfluidic channel. The microfluidic structure layer includes two microfluidic channels 01 and 02 arranged at intervals. The minimum gap between the two microfluidic channels 01 and 02 is smaller than the size of one electrode 03, and thus at least one particular electrode y must be present in the electrode array layer and overlaps both the microfluidic channels 01 and 02 in the direction perpendicular to the microfluidic structure layer. The droplet 041 in the microfluidic channel 01 moves in a direction towards the electrode y1, and the droplet 042 in the microfluidic channel 02 moves in a direction towards the electrode y2. When the driver circuit applies a voltage to the electrode y, the droplet 041 in the microfluidic channel 01 moves above the electrode y, but the droplet 042 in the microfluidic channel 02 also moves towards the electrode y. In this way, the electrode y interferes with the movement control of the droplet 042 in the microfluidic channel 02, which causes an error in the movement path of the droplet 042, resulting in that the droplet 042 cannot reach a predetermined location according to its corresponding drive timing and eventually affecting the experimental result. In view of the above, in the microfluidic apparatus provided in the embodiment, the orthographic projection of the minimum gap between two adjacent microfluidic channels on the electrode array layer is controlled to cover at least one electrode.

Figure 9:
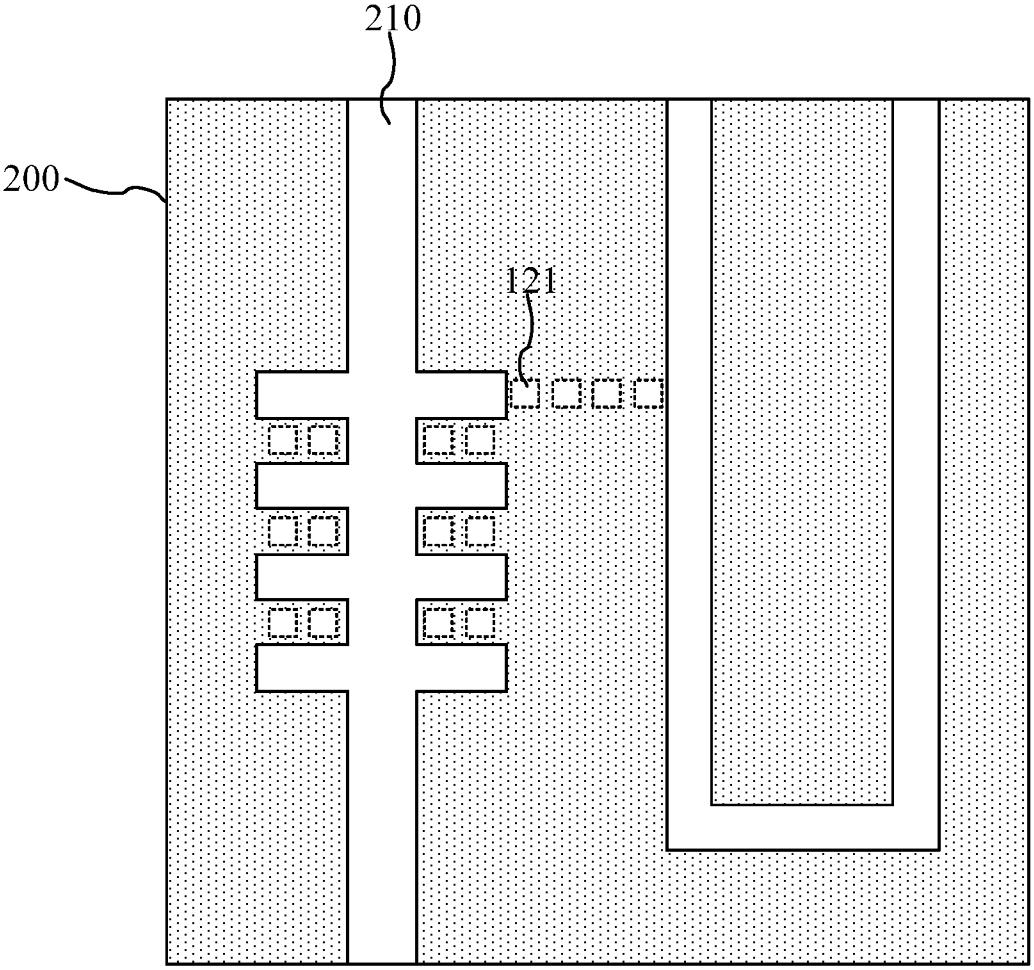
FIG. 9 is a schematic diagram of a second microfluidic structure layer according to an embodiment of the present disclosure.

With reference to FIG. 9, FIG. 9 is a schematic diagram of a microfluidic structure layer according to an embodiment of the present disclosure. As shown in FIG. 9, the microfluidic structure layer 200 includes two microfluidic channels 210 arranged at intervals. The orthographic projection of the minimum gap between two adjacent microfluidic channels 210 on the electrode array layer covers at least one electrode 121, and thus the movement control of droplets in the two adjacent microfluidic channels 210 does not interfere with each other, avoiding the movement of droplets from being affected by crosstalk caused by adjacent electrodes 121. In this way, the microfluidic substrate can control the movement of droplets in a plurality of microfluidic channels separately or simultaneously.

Figure 10:
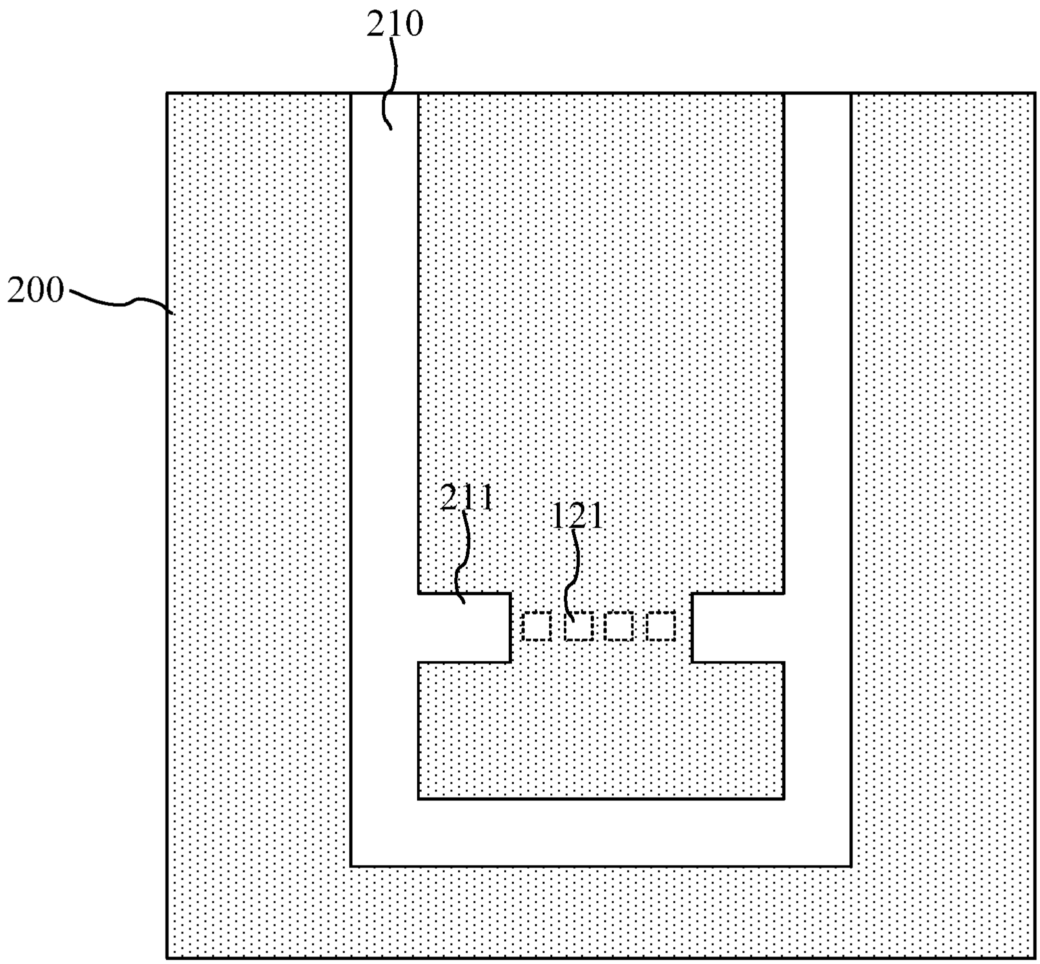
FIG. 10 is a schematic diagram of a third microfluidic structure layer according to an embodiment of the present disclosure.

With reference to FIG. 10, FIG. 10 is a schematic diagram of a microfluidic structure layer according to an embodiment of the present disclosure. As shown in FIG. 10, the microfluidic structure layer 200 includes one microfluidic channel 210, and the microfluidic channel 210 includes a plurality of sub-channels 211. The orthographic projection of the minimum gap between two adjacent sub-channels 211 on the electrode array layer covers at least one electrode 121, and thus the movement control of droplets in the two adjacent sub-channels 211 does not interfere with each other, avoiding the movement of droplets from being affected by crosstalk caused by adjacent electrodes 121. In this way, the microfluidic substrate can control the movement of a plurality of droplets in one microfluidic channel separately or simultaneously.

Figure 11:
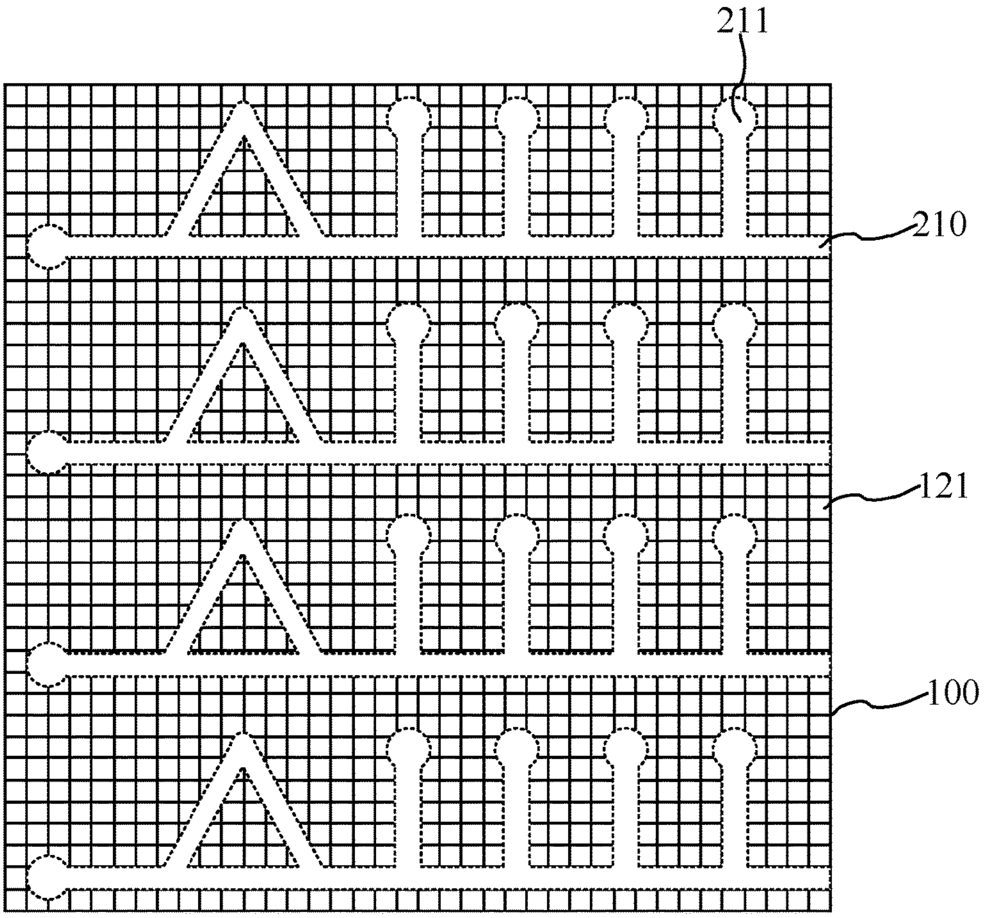
FIG. 11 is a schematic diagram of a sixth microfluidic apparatus according to an embodiment of the present disclosure.

With reference to FIG. 11, FIG. 11 is a schematic diagram of a microfluidic apparatus according to an embodiment of the present disclosure. As shown in FIG. 11, the microfluidic structure layer of the microfluidic apparatus includes a plurality of microfluidic channels 210, and each of the plurality of microfluidic channels 210 includes a plurality of sub-channels 211. The orthographic projection of the minimum gap between two adjacent sub-channels 211 on the electrode array layer covers at least one electrode 121, and the orthographic projection of the minimum gap between two adjacent microfluidic channels 210 on the electrode array layer covers at least one electrode 121. In this way, the movement control of droplets in the two adjacent microfluidic channels 210 and the two adjacent sub-channels 211 does not interfere with each other, and there is no crosstalk between adjacent electrodes. Therefore, the microfluidic substrate 100 can control the movement of droplets in the plurality of microfluidic channels 210 separately or simultaneously and/or control the movement of a plurality of droplets in one microfluidic channel 210 separately or simultaneously. Therefore, the microfluidic apparatus can achieve high-throughput biochemical reactions.

Figure 12:
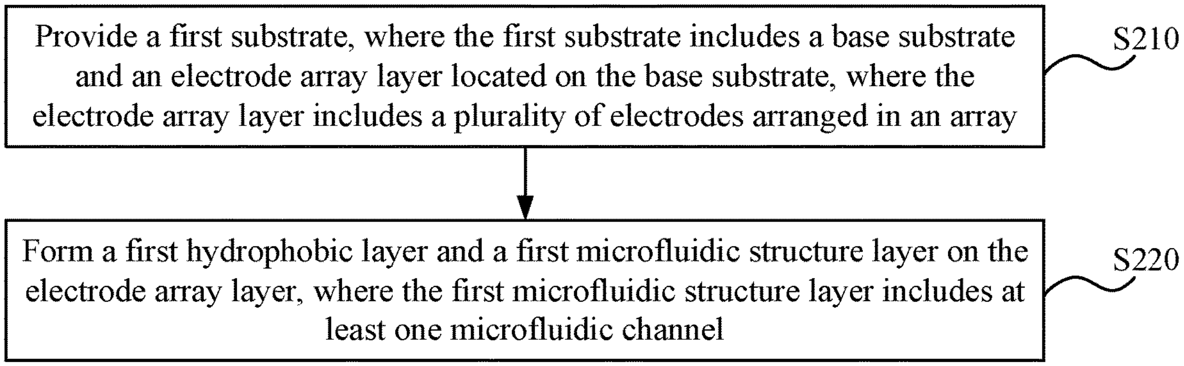
FIG. 12 is a flowchart of a manufacturing method of a microfluidic apparatus according to an embodiment of the present disclosure.
Figure 13:
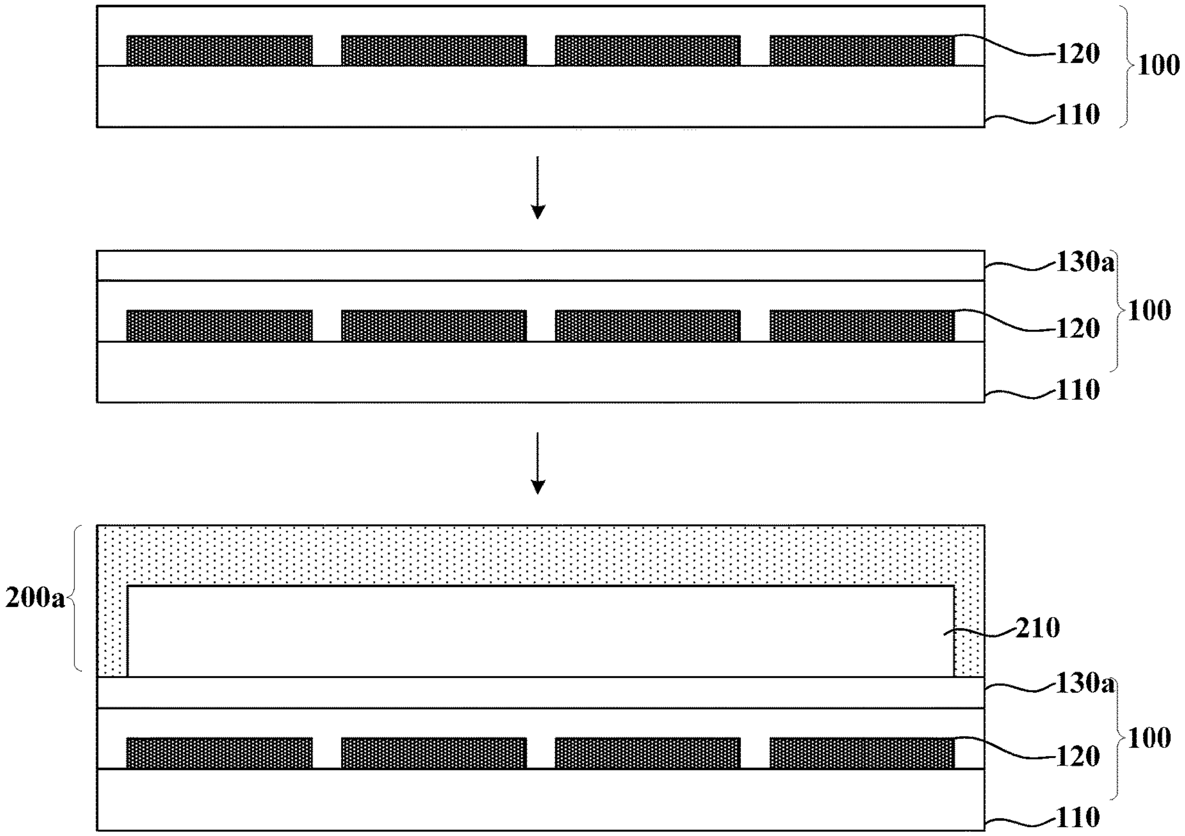
FIG. 13 is a schematic diagram of a flow of manufacturing a microfluidic apparatus according to an embodiment of the present disclosure.

Based on the same concept, an embodiment of the present disclosure further provides a manufacturing method of a microfluidic apparatus. The manufacturing method provided by the embodiment can be used in the microfluidic apparatus provided by any of the embodiments described above. With reference to FIGS. 12 and 13, FIG. 12 is a flowchart of a manufacturing method of a microfluidic apparatus according to an embodiment of the present disclosure, and FIG. 13 is a schematic diagram of a flow of manufacturing a microfluidic apparatus according to an embodiment of the present disclosure.

As shown in FIG. 12, the manufacturing method includes steps S210 and S220 described below.

In S210, a first substrate is provided, where the first substrate includes a base substrate and an electrode array layer located on the base substrate, where the electrode array layer includes a plurality of electrodes arranged in an array.

In S220, a first hydrophobic layer and a first microfluidic structure layer are formed on the electrode array layer, where the first microfluidic structure layer includes at least one microfluidic channel.

In an embodiment, the operation in which the first hydrophobic layer and the first microfluidic structure layer are formed on the electrode array layer in step S220 includes: the first hydrophobic layer is formed on the electrode array layer by the coating process or a hydrophobic layer film is attached on the electrode array layer to form the first hydrophobic layer, and then the first microfluidic structure layer is bonded to the first hydrophobic layer. Alternatively, the operation in which the first hydrophobic layer and the first microfluidic structure layer are formed on the electrode array layer in step S220 includes: the first hydrophobic layer and the first microfluidic structure layer are bonded to each other, and then the first hydrophobic layer adheres to the electrode array layer.

As shown in FIG. 13, a first substrate 100 is provided, where the first substrate 100 includes a base substrate 110 and an electrode array layer 120 located on the base substrate 110, where the electrode array layer 120 includes a plurality of electrodes arranged in an array. It is to be understood that the film structure of the first substrate 100 includes, but is not limited to, the base substrate 110 and the electrode array layer 120, where the first substrate 100 also includes other film layers that assist in the operation of the electrodes in the electrode array layer. A first hydrophobic layer **130*a* and a first microfluidic structure layer 200*a* are formed on the electrode array layer 120, where the first microfluidic structure layer 200*a* includes at least one microfluidic channel 210**.

In an embodiment, the composition material of the first microfluidic structure layer **200*a* includes a polymer, and the first microfluidic structure layer 200*a* is bonded to the first hydrophobic layer 130*a* by the plasma surface bonding process. In an embodiment, the composition material of the first hydrophobic layer 130*a* includes a polymer. In an embodiment, the first microfluidic structure layer 200*a* is a PDMS structure layer or a PC structure layer, and/or the first hydrophobic layer 130*a*** is a PDMS structure layer or a PC structure layer.

Figure 14:
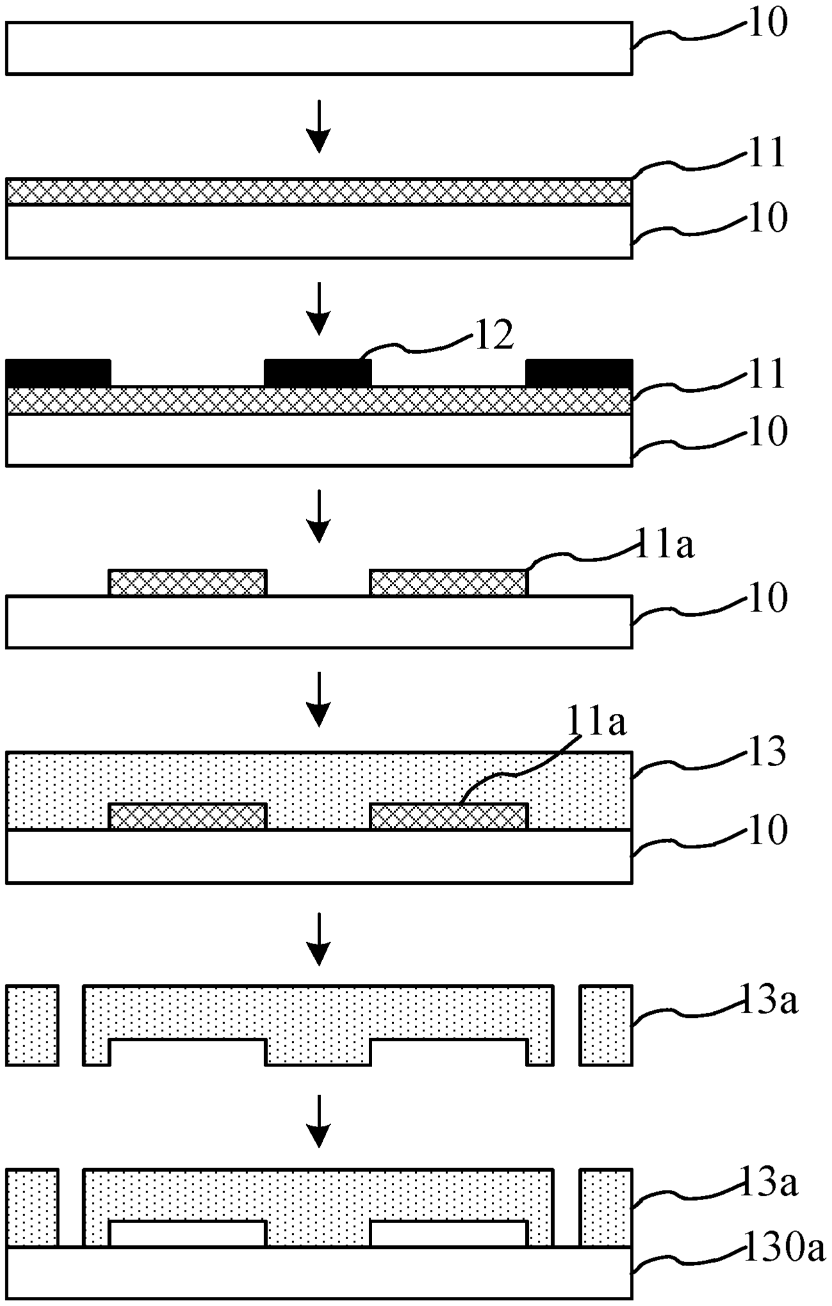
FIG. 14 is a schematic diagram of a flow of manufacturing a microfluidic structure layer according to an embodiment of the present disclosure.

With reference to FIG. 14, FIG. 14 is a schematic diagram of a flow of manufacturing a microfluidic structure layer according to an embodiment of the present disclosure. The first microfluidic structure layer is manufactured by the following process: providing a substrate 10 such as a Si substrate; coating photoresist 11 on the substrate 10; exposing the photoresist 11 to ultraviolet light through a mask plate 12; forming a microfluidic channel mask structure **11*a* on the substrate 10 after treatment of baking and developing; after cleaning the microfluidic channel mask structure 11*a*, forming a PDMS layer 13 on the microfluidic channel mask structure 11***a*; obtaining a PDMS structure layer 13*a* by drying, stripping, and punching the PDMS layer 13; and finally, bonding the PDMS structure layer 13*a* to the first hydrophobic layer 130*a* on the first substrate 100 to form a microfluidic apparatus. It is to be understood that the method of manufacturing the microfluidic structure layer using PC material or other materials is shown in FIG. 14, which is not described in detail herein.

In an embodiment, the PDMS structure layer and the first substrate are bonded to each other by the plasma surface bonding process, where a polar group Si—OH is introduced into the surface of one side of the PDMS structure layer facing towards the first substrate to replace a Si—$CH_3$ group in the PDMS structure layer. Si—OH and the group on the surface of the first substrate (such as OH, COOH, and C═O) are condensed to form the tight bonding of the covalent bond, thereby achieving the bonding of both Si—OH and the group.

Figure 15:
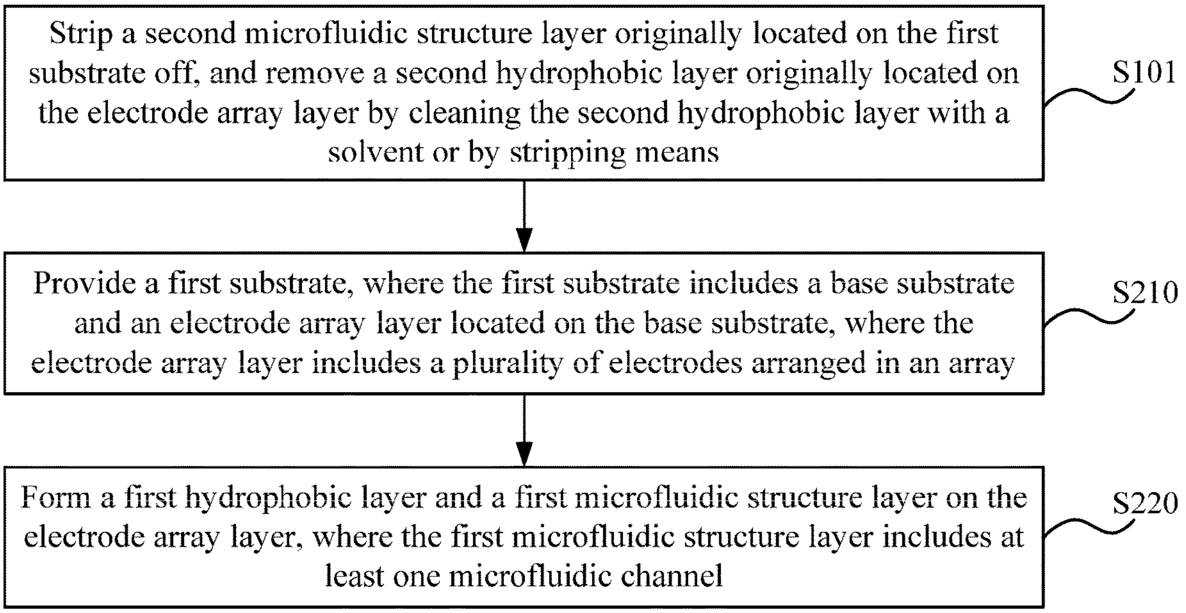
FIG. 15 is a flowchart of a manufacturing method of another microfluidic apparatus according to an embodiment of the present disclosure.
Figure 16:
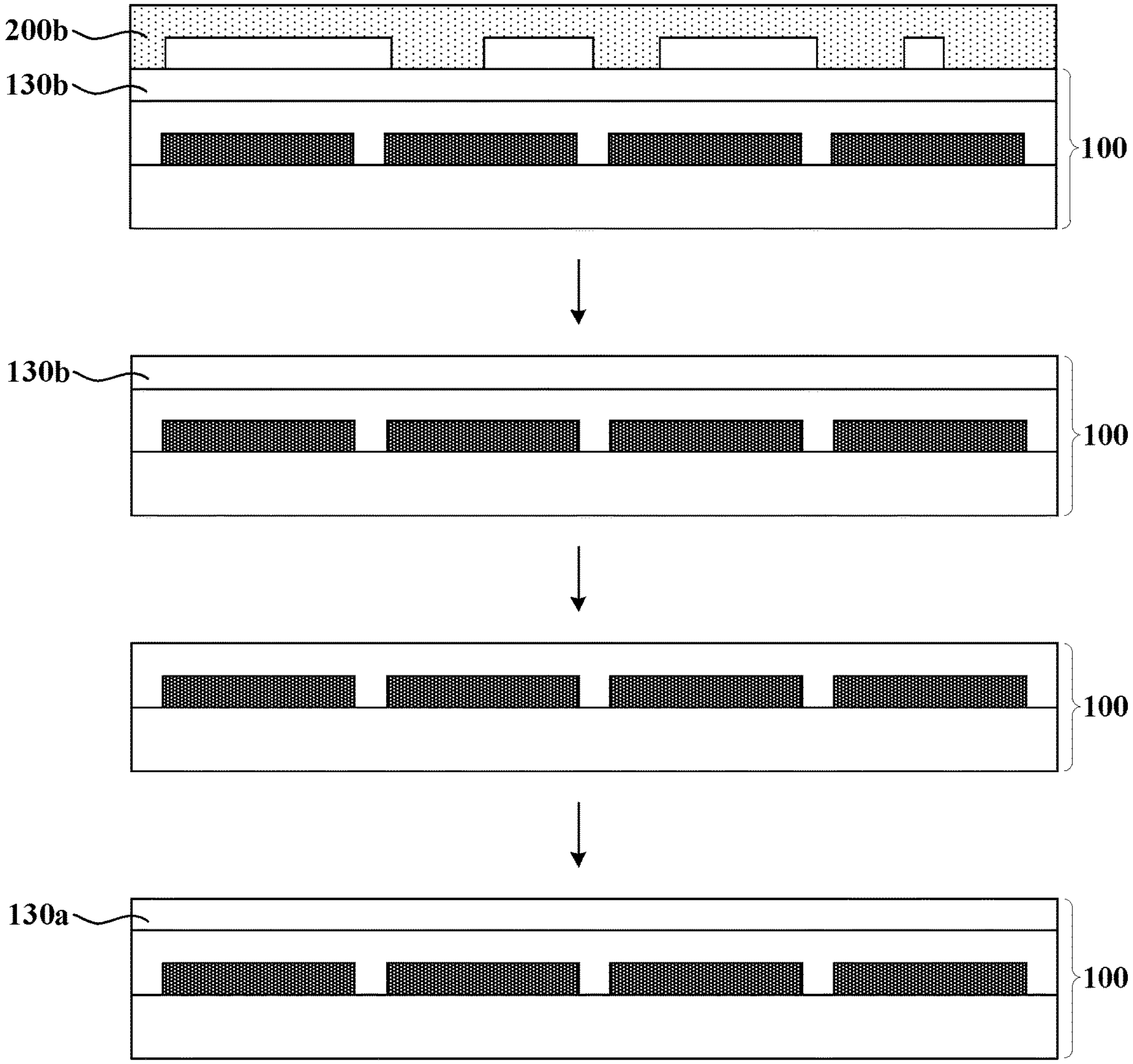
FIG. 16 is a schematic diagram of a flow of manufacturing another microfluidic apparatus according to an embodiment of the present disclosure.

With reference to FIGS. 15 and 16, FIG. 15 is a flowchart of a manufacturing method of a microfluidic apparatus according to an embodiment of the present disclosure, and FIG. 16 is a schematic diagram of a flow of manufacturing a microfluidic apparatus according to an embodiment of the present disclosure. In an embodiment, before the operation in which the first substrate is provided in step S210, the method further includes step S101.

In S101, a second microfluidic structure layer originally located on the first substrate is stripped off, and a second hydrophobic layer originally located on the electrode array layer is removed by cleaning the second hydrophobic layer with a solvent or by stripping means. In an embodiment, the microfluidic structure layer is detachably bonded to the first substrate.

As shown in FIG. 16, if the first substrate 100 originally has a second microfluidic structure layer 200*b* and a first microfluidic structure layer 200*a* is a structure layer to be replaced, the second microfluidic structure layer 200*b* originally on the first substrate 100 needs to be stripped off before the first microfluidic structure layer 200*a* is bonded to the first substrate 100. After the second microfluidic structure layer 200*b* is stripped off, the second hydrophobic layer 130*b* which was in direct contact with the second microfluidic structure layer 200*b* in the first substrate 100 has been contaminated with droplets, and there may still be stripping damage on the hydrophobic layer 130*b*. Thus, the second hydrophobic layer 130*b* is cleaned with a solvent and then removed to obtain the first substrate 100 that can be reused. The hydrophobic material is then recoated on the first substrate 100 according to step S220 to form a first hydrophobic layer 130*a*.

In other embodiments, the hydrophobic layer may also be a hydrophobic patch film. In the process of removing the hydrophobic layer on the substrate, the original hydrophobic patch film on the substrate may be removed by directly stripping the original hydrophobic patch film off; and/or in the process of re-forming the hydrophobic layer on the substrate, a new hydrophobic layer may be formed by directly attaching a hydrophobic patch film to the substrate.

Figure 17:
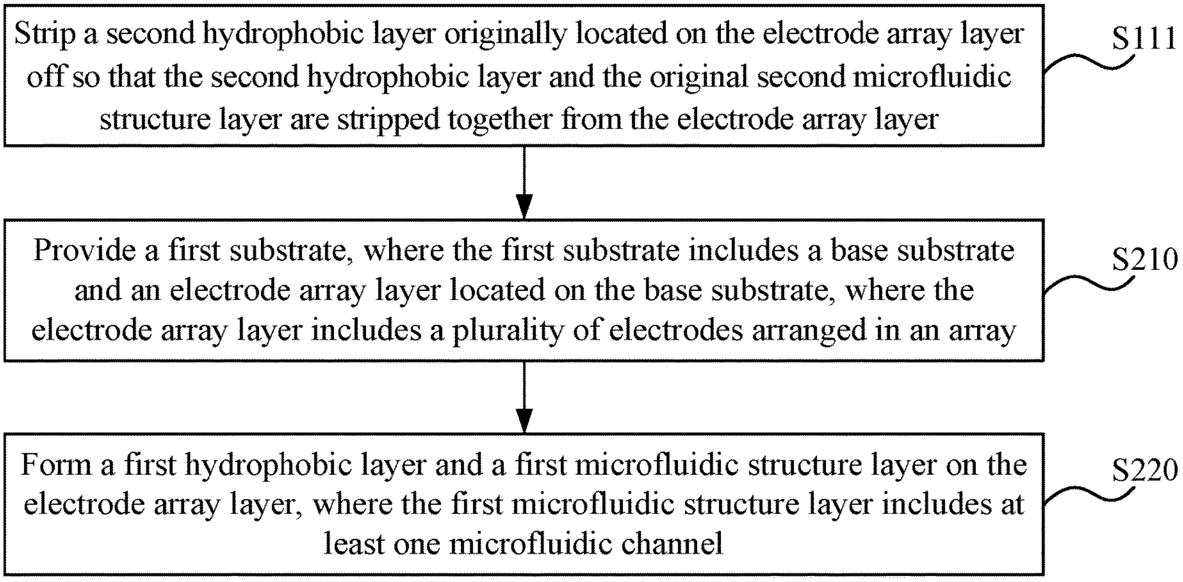
FIG. 17 is a flowchart of a manufacturing method of another microfluidic apparatus according to embodiments of the present disclosure.
Figure 18:
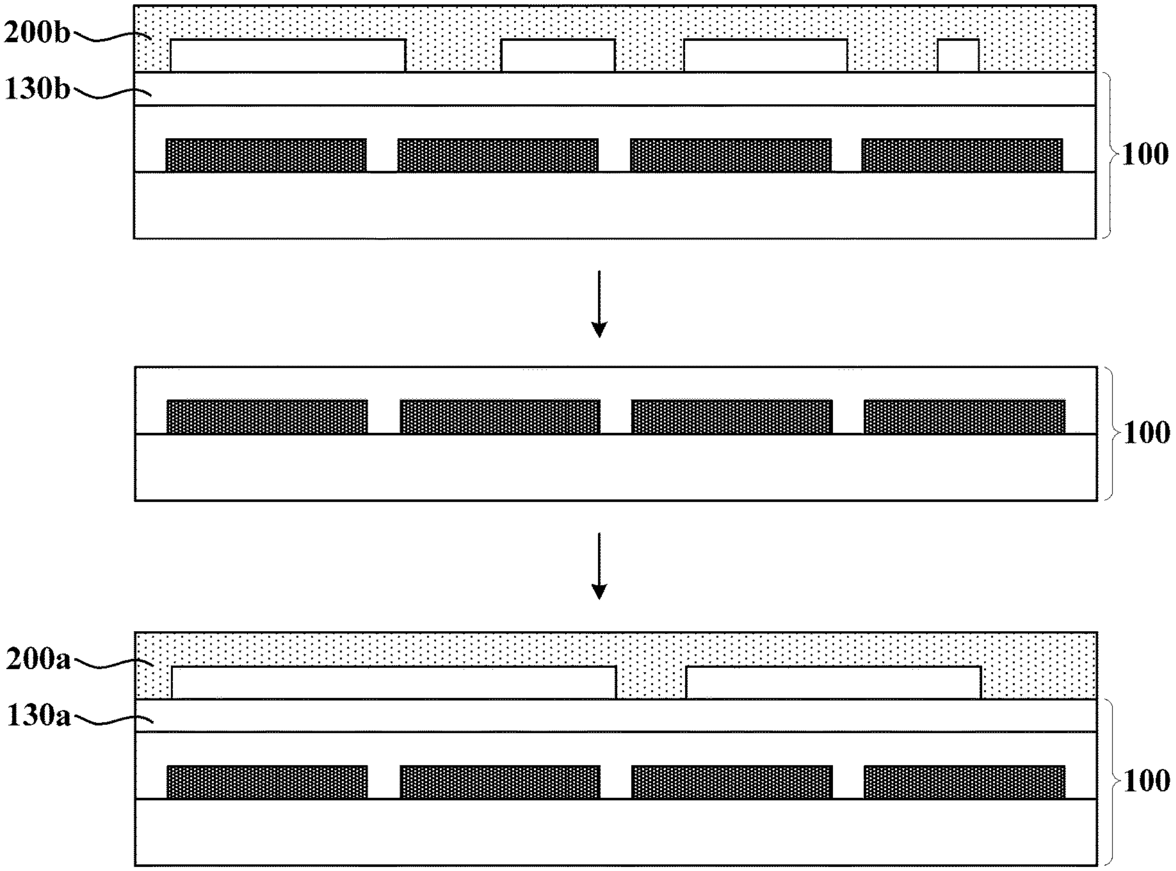
FIG. 18 is a schematic diagram of a flow of manufacturing another microfluidic apparatus according to an embodiment of the present disclosure.

With reference to FIGS. 17 and 18, FIG. 17 is a flowchart of a manufacturing method of a microfluidic apparatus according to an embodiment of the present disclosure, and FIG. 18 is a schematic diagram of a flow of manufacturing a microfluidic apparatus according to an embodiment of the present disclosure. In an embodiment, before the operation in which the first substrate is provided in step S210, the method further includes step S111.

In S111, a second hydrophobic layer originally located on the electrode array layer is stripped off so that the second hydrophobic layer and the original second microfluidic structure layer are stripped together from the electrode array layer. In an embodiment, the second hydrophobic layer is detachably bonded to the first substrate.

As shown in FIG. 18, if the first substrate 100 originally has a second microfluidic structure layer 200*b* and a first microfluidic structure layer 200*a* is a structure layer to be replaced, the second hydrophobic layer 130*b* originally on the first substrate 100 needs to be stripped off before the second microfluidic structure layer 200*b* is replaced with the first microfluidic structure layer 200*a*, that is, the second hydrophobic layer 130*b* and the second microfluidic structure layer 200*b* on the second hydrophobic layer 130*b* are stripped from the first substrate 100 as a whole. After the second hydrophobic layer 130*b* and the second microfluidic structure layer 200*b* are stripped off, a bonding structure of a first hydrophobic layer 130 and the first microfluidic structure layer 200*a* is provided to bond the first hydrophobic layer 130*a* to the first substrate.

It is to be noted that, before the microfluidic structure layer is stripped off, according to the experimental requirements, the liquid in the microfluidic channel needs to be discharged and collected; and the microfluidic structure layer may also be placed and removed with the operation of cleaning or replacement of the hydrophobic layer when the microfluidic structure layer is no longer reused.

In the embodiments of the present disclosure, a microfluidic apparatus integrated with an electrowetting drive function is provided. The device is an integration of a digital microfluidic apparatus and a continuous microfluidic apparatus and can more accurately and flexibly control the droplets, thereby saving the use cost of reagent. The microfluidic substrate of the microfluidic apparatus is a reusable structure, and the microfluidic structure layer of the microfluidic apparatus is a detachable structure. Therefore, in different experimental schemes, the microfluidic structure layer on the microfluidic substrate can be replaced as needed, thereby achieving the reuse of the microfluidic substrate and reducing the cost of the device. In addition, the microfluidic channel is a closed structure and thus can enable experimental testing of various biological reagents.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure has been described in detail via the preceding embodiments, the present disclosure is not limited to the preceding embodiments and may include equivalent embodiments without departing from the concept of the present disclosure. The scope of the present disclosure is determined by the scope of the appended claims.

What is claimed is:

1. A microfluidic apparatus, comprising:

a microfluidic substrate, wherein the microfluidic substrate comprises a base substrate, an electrode array layer located on the base substrate, and a hydrophobic layer, and wherein the electrode array layer comprises a plurality of electrodes arranged in an array; and a microfluidic structure layer, wherein the microfluidic structure layer comprises at least one microfluidic channel;

wherein the microfluidic substrate is configured to apply a voltage to each electrode of the plurality of electrodes according to the at least one microfluidic channel to drive a droplet in each of the at least one microfluidic channel to move, wherein the microfluidic structure layer is detachably bonded to the hydrophobic layer, the hydrophobic layer is detachably adhered to the electrode array layer, and the microfluidic structure layer and the hydrophobic layer are configured to be able to be completely stripped from the microfluidic substrate, and wherein at least one side of the microfluidic structure layer is provided with a stripping structure, wherein the stripping structure comprises a raised structure of the microfluidic apparatus or a groove structure of the microfluidic apparatus, the raised structure and the microfluidic structure layer are integrated, or the groove structure is a gap between the microfluidic structure layer and the hydrophobic layer in a direction perpendicular to the microfluidic substrate.

2. The microfluidic apparatus of claim 1, wherein a composition material of the microfluidic structure layer comprises a polymer.

3. The microfluidic apparatus of claim 2, wherein the microfluidic structure layer is bonded to the hydrophobic layer by using a plasma surface bonding process.

4. The microfluidic apparatus of claim 1, wherein the microfluidic apparatus comprises at least one of the following: in a direction perpendicular to the microfluidic substrate, a gap exists between the stripping structure and the hydrophobic layer, or an orthographic projection of the stripping structure on the microfluidic substrate does not overlap the hydrophobic layer and the stripping structure is disposed adjacent to the hydrophobic layer.

5. The microfluidic apparatus of claim 1, wherein a composition material of the hydrophobic layer comprises a polymer.

6. The microfluidic apparatus of claim 5, wherein the hydrophobic layer is detachably bound to the electrode array layer by using a plasma surface bonding process.

7. The microfluidic apparatus of claim 1, wherein at least one side of the hydrophobic layer is provided with a stripping structure, and the stripping structure comprises a raised structure of the microfluidic apparatus or a groove structure of the microfluidic apparatus; and in a direction perpendicular to the microfluidic substrate, an orthographic projection of the stripping structure on the microfluidic substrate does not overlap the hydrophobic layer.

8. The microfluidic apparatus of claim 1, wherein the microfluidic structure layer is a polydimethylsiloxane (PDMS) structure layer or a polycarbonate (PC) structure layer; or, the hydrophobic layer is a PDMS structure layer or a PC structure layer.

9. The microfluidic apparatus of claim 1, wherein the microfluidic structure layer comprises a plurality of microfluidic channels arranged at intervals, an orthographic projection of a minimum gap between two adjacent microfluidic channels of the plurality of microfluidic channels on the electrode array layer covers at least one of the plurality of electrodes; and the microfluidic substrate is configured to apply a voltage to the each electrode according to each microfluidic channel of the plurality of microfluidic channels to drive a droplet in the each microfluidic channel to move at a same time or to move at different times.

* * * * *